Patented Dec. 21, 1948

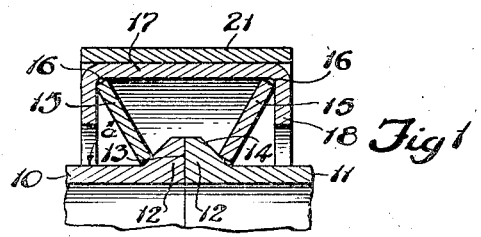
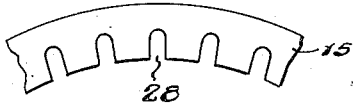
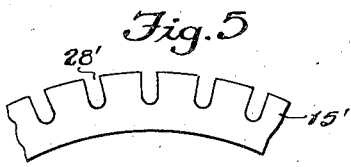
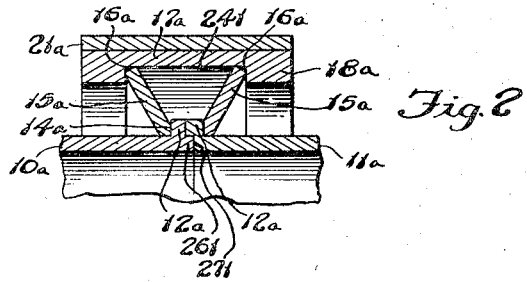
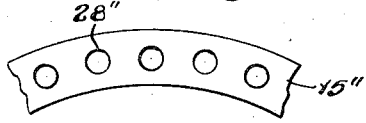
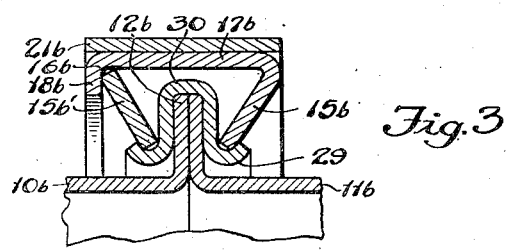
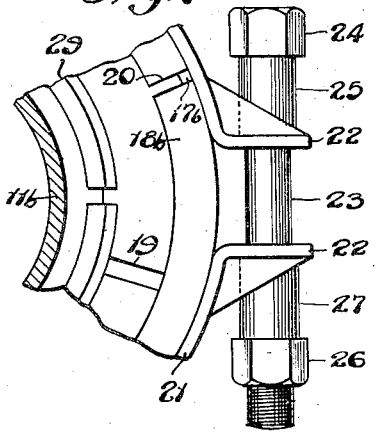
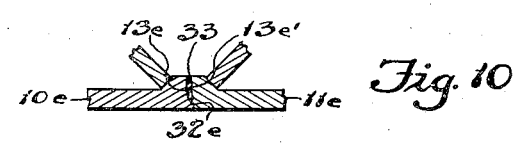
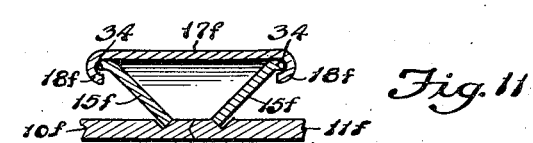

2,457,077

UNITED STATES PATENT OFFICE 2,457,077

TUBE CLAMP

Theodore Alan Woolsey, Inglewood, Calif., assignor to Marman Products Co., Inc., a corporation of California Application December 10, 1946, Serial No. 715,249

7 Claims. (Cl. 285—129)

This invention relates to tube clamps. Its general object is to provide an efficient clamp for connecting the ends of tubular members in adjoining relation.

The invention utilizes a construction in which tension developed in a constrictor ring is transformed into pressure in a pair of axially opposed compression ring units that are inclined conically inwardly and toward each other from the constrictor ring to flanges or shoulders on the adjoining tube ends to produce opposed, axially directed forces pressing the tube ends together. A particular object of the present invention is to provide a clamp of this type that is quite simple and inexpensive in construction. Another object is to provide a clamp of this type that is easily assembled with adjoining pipe ends. A further object is to provide such a clamp having maximum efficiency of conversion of constricting tension into axial pressure.

A particular object of my invention is to provide a clamp of this type which is especially suitable for embodiment in a heavy-duty structure.

Other objects of the invention will become apparent in the ensuing specifications, in connection with the appended drawings, in which:

Fig. 1 is a sectional view of a tube clamp embodying one form of my invention;

Fig. 2 is a sectional view of a tube clamp embodying a somewhat modified form of the invention;

Fig. 3 is a sectional view of a tube clamp embodying another modified form of the invention;

Fig. 4 is a side view of a portion of one form of compression ring that may be embodied in either of the forms of the invention shown in Figs. 1, 2, and 3;

Fig. 5 is a side view of a portion of a modified form of compression ring that may be embodied in either of the forms shown in Figs. 1, 2, 3;

Fig. 6 is a side view of a portion of another modified form of compression ring that may be employed in either of the forms of the invention shown in Figs. 1, 2, and 3; and Fig. 7 is a sectional view through a portion of a tube assembly embodying my invention.

Fig. 8 is a sectional view of a portion of a tube assembly embodying a modified form of the invention;

Fig. 9 is a sectional view of a portion of a tube assembly embodying another modification of the invention;

Fig. 10 is a sectional view of a portion of a tube assembly embodying a further modification of the invention; and Fig. 11 is a sectional view of a portion of a tube assembly embodying another modified form of the invention.

In the form of the invention shown in Fig. 1, a pair of tubular members 10 and 11 have abutting ends formed with flanges 12 which provide abutting end surfaces 13 adapted to make sealing engagement with each other. The opposite sides of the flanges 12 provide frusto-conical shoulders 14 for coaction with the compression rings 15 of my improved tube clamp.

The compression rings 15 are frusto-conical. Their inner edges are engaged against the shoulders 14 and their peripheral edges are engaged in corners 16 defined between the rim portion 17 of a retainer ring and the side flanges 18 of such retainer ring.

The rings 15 and 17, 18 are split rings, i. e., they are circumferentially interrupted by slots such as the slots 19, 20, shown in Fig. 7.

Constricting pressure is applied to the retainer ring 17, 18 by a tension band 21 which may, like the band 21 in Fig. 7, have its ends bent outwardly to form ears 22 through which may be passed a clamp bolt 23. A head 24 on one end of the bolt may apply pressure to one of the ears 22 through a sleeve 25, and a nut 26 threaded on the other end of the bolt may apply pressure to the other ear 22 through a sleeve 27.

As the tension band 21 is drawn tight, radial pressure is applied through the retainer ring 17 to the peripheral edges of the rings 15. Such radial pressure tends to spread the peripheral edges of the rings 15 apart. Such spreading movement is prevented by the flanges 18, which therefore apply axial pressure to the peripheries of the rings 15. The constricting forces applied to the flanges 12 through the inclined compression members 15 therefore produce axial resultants of pressure against the shoulders 14, forcing the abutting faces 13 into sealing engagement. The ratio between the constricting force and the axial force resulting therefrom depends upon the angle subtended between the rings 15 and tube members 10, 11. This angle is indicated at $a$ in Fig. 1. The angle $a$ may be greater or less than 45 degrees, although an angle of approximately 45 degrees is found to be quite satisfactory in most installations. Where the angle $a$ is 45 degrees, the ratio between the constricting pressure and the axial pressure is unity. With an angle of less than 45 degrees, a given constricting pressure will produce a greater axial resultant.

A clamp may be assembled with the tubes 10, 11 by first inserting the rings 15 over the ends of the tubes 10, 11 (spreading them sufficiently to pass over the flanges 12), then sliding the rings 15 into engagement with the shoulders 14, then spreading the retainer ring 17, 18 sufficiently to pass it over the peripheries of the rings 15 and subsequently drawing it together around the rings 15.

Some deformation of the rings 15 will take place under the clamping action of the retainer ring 17. This tends to set up circumferential stresses in the rings 15 which stresses may be partially relieved by notches 28 in the inner periphery of the ring as shown in Fig. 4, or notches 28' in the outer periphery of the ring 15' as shown in Fig. 5. These notches may also serve for weight-saving purposes. Fig. 6 illustrates how the rings 15" may be provided with openings 28" for weight-saving.

The notches 28, 28' may, in addition to their functions pointed out above, also provide for ventilation in high temperature applications.

In large diameter installations there may be sufficient resiliency in the material of rings 15, 15a, 15b to eliminate the necessity for the notches 28, 28'.

A particular advantage of the invention resides in the fact that the rings 15 may fulcrum against the shoulders 16 and readily assume the angles required by the various radial and axial dimensions of the rings 15, 17, 18 and flanges 12. For example, as the retainer ring 17, 18 is drawn tighter and its diameter decreased, the angle $a$ will become smaller, the rings 15 tilting against the shoulders 14 and 16. Such tilting movement will be resisted only by the inherent resistance of the rings 15 to change in shape. The added resistance to the tilting of the compression rings, which would be occasioned by having the rings 15 formed integrally with the retainer ring 17, is eliminated. There is therefore a maximum conversion of radial constricting force into axial pressure.

The rings 15 are very readily stamped from sheet metal and may be identical with each other. They also may be fabricated by rolling strip steel into conical shape and cutting to proper lengths. This reduces die cost and facilitates manufacture. The retainer ring 17, 18 may be given its cross sectional shape in a rolling operation in which a long strip of material having the final or approximately the final cross sectional shape, is formed. Such strip may then be cut into correct lengths and then curled in a subsequent rolling operation, to form the split rings. The corners 16 completely confine the peripheries of the rings 15 so as to maintain said peripheries securely in their proper positions for transmission of forces diagonally inward from the shoulders 16 to the shoulders 14.

Another advantage of the invention resides in the fact that the thickness of the rings 15 need not necessarily be the same as the thickness of the retainer ring 17, 18. A heavy duty structure, for use where high pressures are required, is shown in Fig. 2. In this construction, the flanges 18a are extra thick, being formed by rolling a channel 241 into a ring so as to form the rim member 17a between the thickened flanges 18a. The compression rings 15a are, in this case, engaged between the shoulders 16a and flanges 12a on the tube members 10a, 11a respectively. The flanges 12a have radial shoulders 14a instead of the inclined shoulders 14, such radial shoulders combining with the peripheral surfaces of the tubes 10a, 11a to define corners in which the inner extremities of the rings 15a are confined. The action is the same as in the form shown in Fig. 1, the tension band 21 tightening the retainer ring 17a, 18a against the compression rings 15a.

Fig. 2 also illustrates how one of the tubes, as for example the tube 10a, may be formed with an axially projecting flange 261 which is received in a counterbore 271 in the end of the tube 11a to improve the sealing.

I have found that where several cylinders with dome heads are to be clamped, with the cylinders so close together that a standard clamp will not clear, that the structure shown in Fig. 3 may be successfully used. In this case, a compression ring 15b is formed integrally with the retainer rim 17b at one side thereof while a flange 18b turned inwardly from the other side of the rim 17b forms a shoulder 16b in which is confined the periphery of a free compression ring 15b'. The inner extremities of the compression rings 15b, 15b' are engaged against shoulders 29 formed at the inner extremities of the side walls of a channeled sealing ring 30. The sealing ring 30 embraces flanges 12b on the respective tube members 10b, 11b. Here the axial compression that is developed as the result of resolution of radial constricting forces into axial components provides a double seal for the ends of the tube member 10b, 11b. That is, the abutting faces of the flanges 12b are pressed together to provide an interior seal, while the flanges 29 are pressed against the outer surfaces of the flanges 12b to provide an exterior seal. Compressive force is provided by the tension band 21b acting against the constrictor rim 17b.

The shoulders 14 need not necessarily be formed by flanges such as 12, 12a, etc. Instead, shoulders 14c may comprise side faces of annular grooves 31 machined or rolled into the tube ends 10c, 11c, as shown in Fig. 8.

Fig. 9 illustrates another form that may be given to the abutting surfaces of the tube ends. Mating frusto-conical end surfaces 32 provide for self alignment and automatic balancing of forces in the rings 15d.

Fig. 10 illustrates another form of this self-alignment feature, in which the frusto-conical surfaces 32e extend through only a portion of the thickness of the tube members 10e, 11e, and in which radial sealing surfaces 13e, 13e' engage a gasket 33 interposed therebetween.

Instead of the radial flanges 18, 18a, 18b of Figs. 1, 2, and 3, the retainer rings 17f may have channeled flanges 18f in which axial flanges 34 on the peripheries of the rings 15f, may be loosely received. The structure is the same in principle as the other forms of the invention, since the peripheral extremities of the rings are free to tilt with reference to the channels 18f.

I claim:

1. Means for clamping together the abutting ends of tubular members, comprising a retainer ring including a rim portion and a shoulder projecting radially inwardly from at least one side thereof, a pair of frusto-conical compression rings extending inwardly and toward each other from the respective sides of said retainer ring, at least one of said compression rings floating between the retainer ring and a respective tubular member, the rim portion and shoulder of said retainer ring defining a corner in which the periphery of said floating compression ring is confined against movement relative to the retainer ring and adapted to tilt in response to compressive action thereagainst by the retainer ring, said compression rings functioning to resolve inwardly directed compressive forces into axial pressures applied to said tubular members so as to urge them toward each other, said tubular members having outwardly extending radial flanges and sealing ring having a channel portion receiving and embracing said flanges and axially projecting shoulder portions at the inner extremities of said channel portion, in which the inner peripheries of said compression rings are seated, the side walls of said channel portion being adapted to be pressed into sealing engagement with the outer surfaces of said two flanges by the axial pressures exerted thereagainst, and to thereby press said flanges into face to face engagement, whereby to effect a double seal.

2. Tube clamping means as defined in claim 1, in which said compression ring has a plurality of radial notches opening into its inner periphery.

3. Tube clamping mechanism as defined in claim 1, in which said one compression ring has a plurality of radial notches opening into its outer periphery.

4. Tube clamping mechanism as defined in claim 1, in which said one compression ring has a plurality of apertures intermediate its inner and outer peripheries.

5. Means for clamping together the abutting ends of tubular members provided with radially outwardly extending flanges, comprising a sealing ring having a channel portion receiving and embracing said flanges and axially projecting shoulder portions at the inner extremities of said channel portion, and a compression ring including a rim portion and a pair of frusto-conical members extending inwardly and toward each other from the respective sides of said rim portion, the inner edges of said frusto-conical portions being engaged against said shoulder portions and operative in response to constricting pressure applied through said rim portion, to press the walls of said channel portion into sealing engagement with the outer surfaces of said tube flanges and to transmit to said flanges, pressure for pressing the engaging faces of said flanges into sealing engagement with each other, whereby to effect a double seal.

6. Means for clamping together the abutting ends of tubular members provided with radially outwardly extending flanges, comprising a sealing ring having a channel portion receiving and embracing said flanges and axially projecting shoulder portions at the inner extremities of said channel portion, and a compression ring including a rim portion and a pair of frusto-conical members extending inwardly and toward each other from the respective sides of said rim portion, the inner edges of said frusto-conical portions being engaged against said shoulder portions and operative in response to constricting pressure applied through said rim portion, to press the walls of said channel portion into sealing engagement with the outer surfaces of said tube flanges.

7. Means for clamping together the abutting ends of tubular members having radially outwardly extending flanges adapted to come together in abutting relation, said means comprising a sealing ring including a channel portion receiving and embracing said flanges and axially projecting shoulder portions at the inner extremities of said channel portions, a constricting ring, and pressure transmitting means converging inwardly from said compression ring and engaging the said shoulder portions to transmit from said constricting ring to said sealing channel, radially inwardly converging forces the resultants of which are effective to press the walls of said sealing channel against said flanges to effect a seal.

THEODORE ALAN WOOLSEY.

REFERENCES CITED

The following references are of record in the file of this patent:

UNITED STATES PATENTS

| Number | Name | Date |
| --- | --- | --- |
| 1,937,881 | Fisher | Dec. 5, 1933 |
| 2,424,436 | Crater | July 22, 1947 |